United States Patent

Hogan

Patent Number: 6,047,069
Date of Patent: Apr. 4, 2000

[54] METHOD AND APPARATUS FOR PRESERVING ERROR CORRECTION CAPABILITIES DURING DATA ENCRYPTION/DECRYPTION

[75] Inventor: Josh Hogan, Los Altos, Calif.

[73] Assignee: Hewlett-Packard Company, Palo Alto, Calif.

[21] Appl. No.: 08/896,002

[22] Filed: Jul. 17, 1997

[51] Int. Cl.[7] .............................. H04L 9/00; G06F 11/00; H03M 13/00
[52] U.S. Cl. ............................................ 380/268; 714/800
[58] Field of Search .......................... 380/28, 268, 201; 714/752, 758, 800; 713/189

[56] References Cited

U.S. PATENT DOCUMENTS

| | | | |
|---|---|---|---|
| 5,285,497 | 2/1994 | Thatcher, Jr. | 380/49 |
| 5,602,595 | 2/1997 | Citta et al. | 348/495 |
| 5,721,747 | 2/1998 | Herrera Van Der Nood et al. | 371/48 |
| 5,802,107 | 9/1998 | Willing | 375/265 |

*Primary Examiner*—Gail O. Hayes
*Assistant Examiner*—Bryan Latham

[57] ABSTRACT

A data encryption/decryption system encrypts data and its associated redundancy bytes while retaining the error correction capabilities of the original data. The error correction function can then be removed, for example, from a storage drive and performed by, e.g. a host processor or a other entity. The storage drive reads the raw data, including error correction codes, from the media and encrypts the data by exclusive OR-ing each error correction code (ECC) block with a new ECC block which was generated using random data and the same ECC scheme. Error correction of the new data block can be performed in the host processor or other entity without exposing the original data. The error correction is valid for any errors that occurred in the original raw data because the ECC redundancy bytes of the random data block were created using the same ECC generator as was used with the original data. A trusted entity decrypts the error corrected data block by creating a random data block that is the equivalent of the random data block created in the storage drive. The error corrected data block is exclusive OR-ed with the random data block and is returned its original decrypted and error corrected state.

18 Claims, 7 Drawing Sheets

∧ = EXCLUSIVE OR

METHOD AND APPARATUS FOR PRESERVING ERROR CORRECTION CAPABILITIES DURING DATA ENCRYPTION/DECRYPTION

BACKGROUND OF THE INVENTION

1. Technical Field

The invention relates to the encryption of data in a computer environment. More particularly, the invention relates to the encryption of data codewords intended for reception and decryption by another entity while preserving the error correction capabilities of the original data.

2. Description of the Prior Art

Error correction methods are commonly used in data transmission channels and data storage devices such as Compact Disc (CD), Digital Video Disc (DVD), Digital Data Storage (DDS), and Digital Video Cassette (DVC) to maintain data integrity. These methods correct errors due to anomalies such as media defects and noise. A typical storage device application performs error correction on data, using the processor onboard the drive, prior to transmission to a host processor.

One approach to reducing the cost of the storage drive is to remove the error correction algorithm from the drive itself and to perform that function in a host computer. In more recent storage systems, the circuitry required to perform error correction on a drive is substantial. It requires expensive static Random Access Memory (RAM) and significant processing power. It is possible to perform error correction of the stored data in the host processor using software, rather than in the drive.

This approach is particularly attractive in applications where there are no requirements for an uninterrupted data stream. The processing power required for error correction varies dramatically with the number of errors to be corrected in a given block. However, the probability of a large number of errors occurring in a block is very low. Therefore, even a less powerful host processor may be able to correct a small number of errors on the fly, and in the infrequently occurring situation of a large number of errors occurring, can halt the data flow and perform error correction in an iterative manner.

There is an increasing pressure in the industry to encrypt or scramble data, typically to prevent the unauthorized copying of the proprietary data. For purposes of this discussion herein, the terms encrypt and scramble are used interchangeably. Some schemes propose to encrypt all or some of the data prior to releasing it on the computer bus. This is accomplished by using an encryption key that is negotiated between the drive and a trusted entity, such as an Moving Pictures Experts Group (MPEG) decoder. Typical to this type of encryption or scrambling schemes is that does not preserve the integrity of error correction codewords and require that error correction be performed in the drive prior to encryption or scrambling therefore precluding the host processor from performing the error correction task.

It would be advantageous to provide an encryption scheme that encrypts data while preserving the integrity of error correction codewords, because this would allow error correction of confidential data to be performed by e.g. host computer without making access available to the confidential data. It would further be advantageous to provide an encryption scheme that is easily implemented without creating a significant burden on either the storage drive or on a trusted entity (e.g. an entity that is required to effect decryption.)

SUMMARY OF THE INVENTION

The invention provides a data encryption/decryption system that encrypts data and its associated redundancy bytes while retaining the error correction capabilities of the original data. As a result, the invention allows cost reduction of storage drives. The invention is easily implemented on a transmission channel or storage drive, as well as other devices.

In the herein discussed system, the error correction functionality is removed from the storage drive and performed by the host processor or by a trusted entity. The storage drive reads the raw data, including error correction codes, from the media and encrypts this data in the following manner. A data block containing random numbers is created that is of the same size as the raw data. Error correction codes are added to the random data block using the same error correction code generation scheme as the raw data. The raw data and random data blocks are then exclusive OR-ed to form an encrypted data block. The resultant error correction codes are valid and therefore allow the new data block to be corrected while in its encrypted form.

Error correction of the new data block can be performed in a host processor or other processing entity without exposing the confidential data to unauthorized access. The error corrected data block may then be decrypted by a trusted entity.

To perform decryption, the trusted entity creates a random data block that is equivalent to the random data block created in the storage drive. The error corrected data block is exclusive OR-ed with the random data block and is thereby returned its original, error corrected state.

DETAILED DESCRIPTION OF THE INVENTION

For purposes of explanation, this discussion uses the example of storage devices. However, the invention applies equally well to the transmission of data via a channel, where the data are protected by error correction codes. This scheme allows the receiver to encrypt the received data without first performing error correction.

Figure 1:
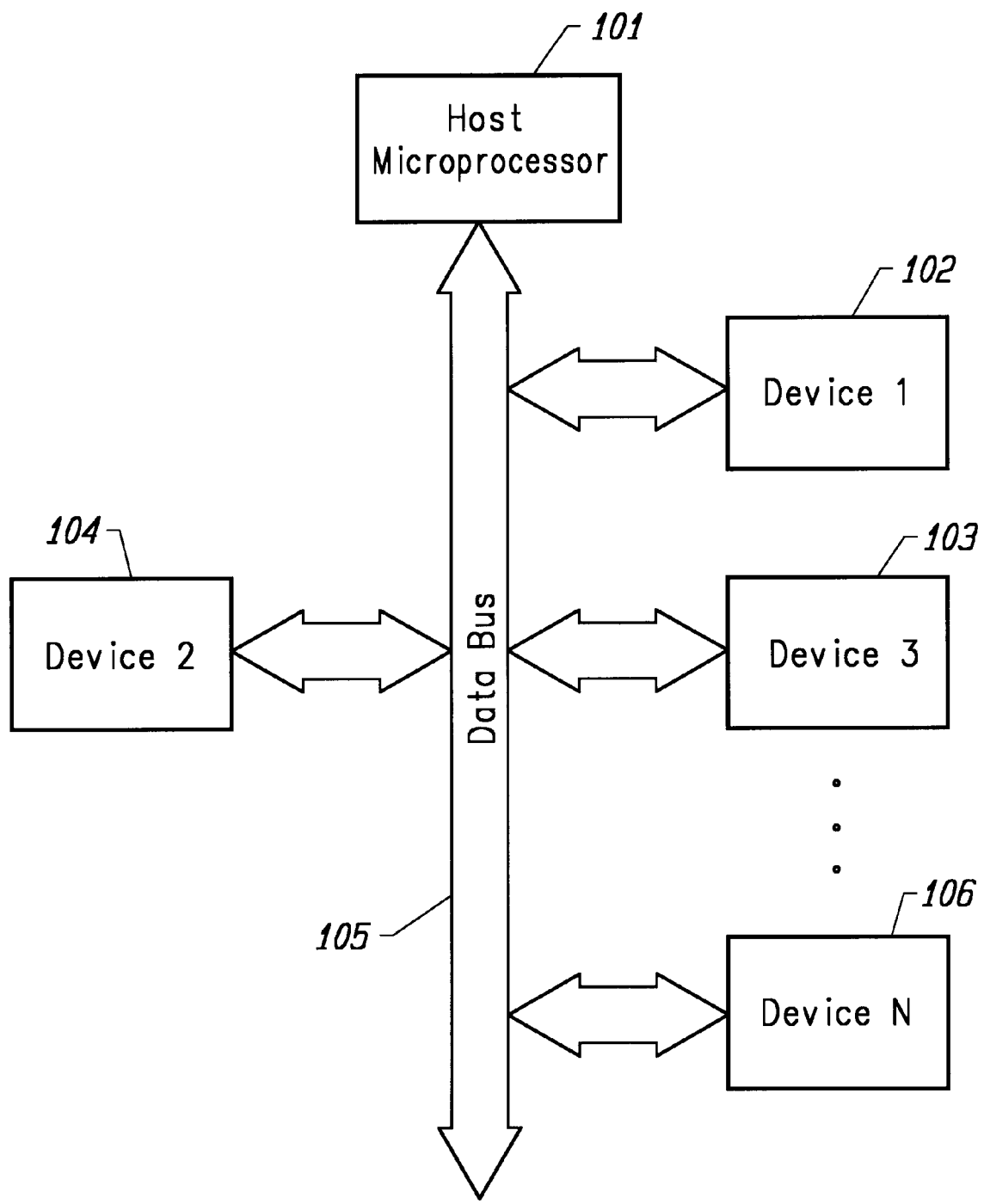
FIG. 1 is a block schematic diagram of a computer system data bus architecture according to the prior art.

Referring to FIG. 1, a typical computer system architecture includes a data bus 105. The data bus 105 shown on FIG. 1 includes a host microprocessor 101 connected to it which is normally the bus master. Several devices 102, 103, 104, 106, may be connected to the data bus. Data are sent between the host processor 105 to Device 1 102, for example, across the data bus 105. Any device that is connected to the data bus 105 can monitor whatever data are transferred across the data bus 105. Such devices also include bus sniffers, such as storage scopes and data analyzers, which may be connected directly to the data bus 105. This makes the data bus 105 a vulnerable and unsecured area of the computer system.

This vulnerability creates a problem that frustrates attempts to cost reduce storage drives. Storage devices that use standards such as Compact Discs (CD), Digital Video Discs (DVD), DDSs, and DVCs, implement error correction methods onboard the drives to maintain data integrity. It is desirable to reduce the cost of storage drives by removing the error correction functionality from the drive by performing that function in the host processor. The cost reduction in the drives comes from reducing the circuitry required to perform error correction on a drive which includes expensive static Random Access Memory (RAM), as well as reduced requirements for processing power.

Figure 2:
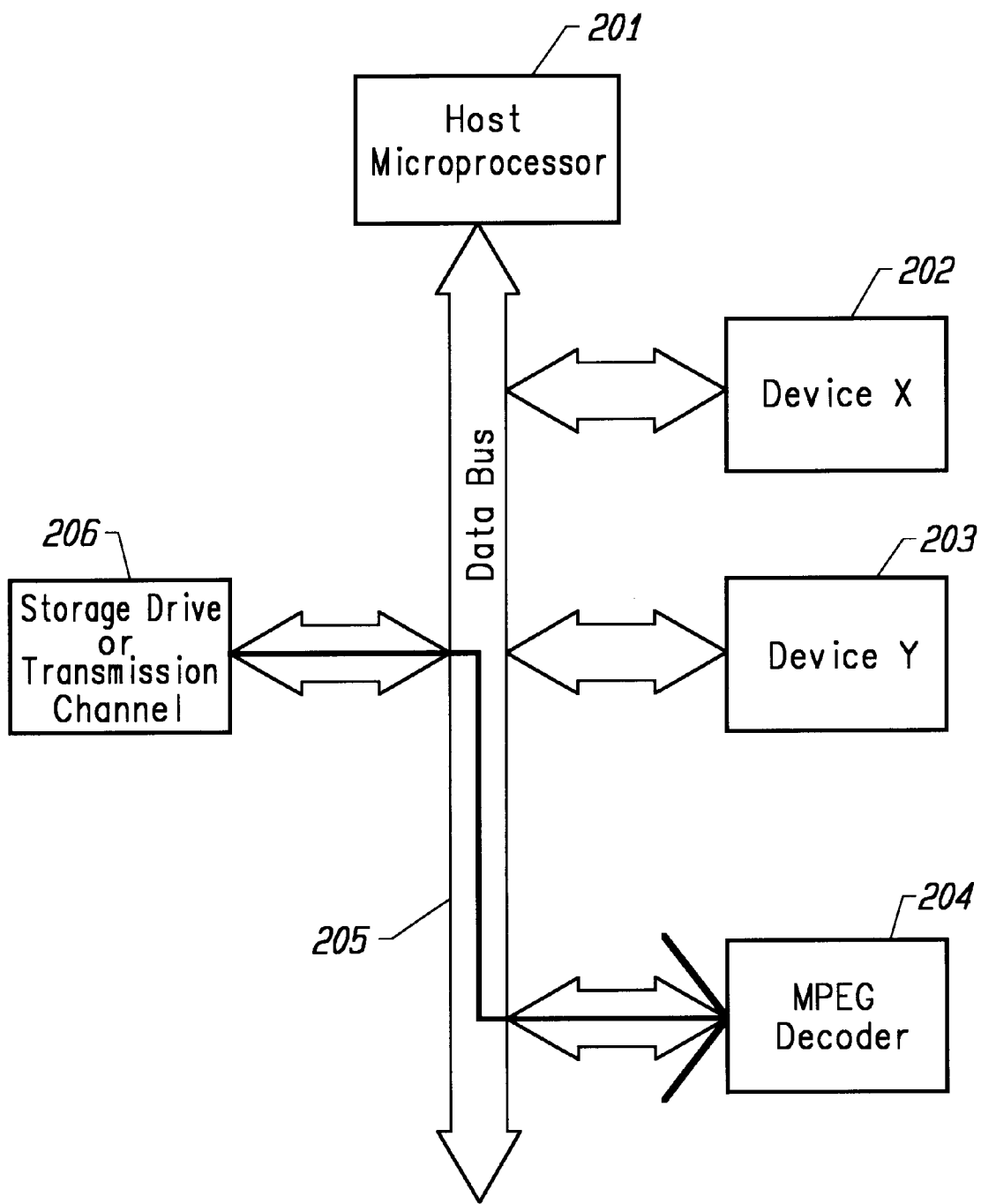
FIG. 2 is a block schematic diagram of a computer system data bus architecture according to the prior art.

With respect to FIG. 2, any data that are transferred from a storage drive or transmission channel 206 across the data bus 205, for example, to a Moving Pictures Experts Group (MPEG) decoder, may be monitored by device X 202 or device Y 203. Therefore, any proprietary information in the data stream may be discovered. As a result, there is an increasing pressure in the industry to encrypt or scramble data to prevent unauthorized copying of the proprietary data.

Figure 3:
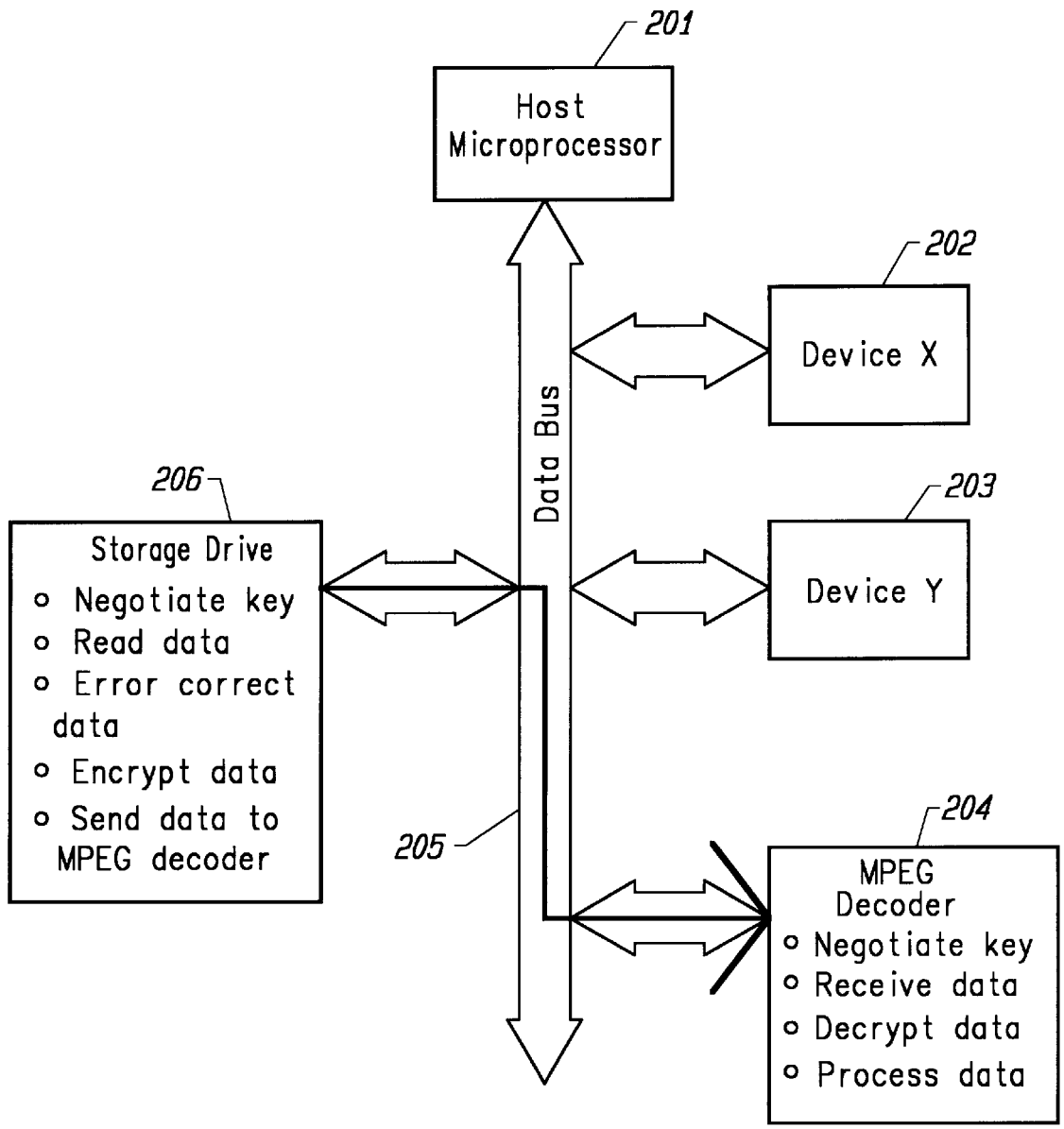
FIG. 3 is a block schematic diagram of a prior art encryption approach in a computer system data bus architecture.

One approach is to encrypt all or some of the data prior to releasing it on the computer bus. This is accomplished by using an encryption key that is negotiated between the drive and a trusted entity, such as an MPEG decoder. Referring to FIG. 3, the drive 206 initially negotiates the encryption key with a trusted entity, the MPEG decoder 204. The drive 206 reads the data from the media and performs error correction on the data. The drive 206 then encrypts the data using the encryption key and then sends the resulting data to the MPEG decoder 204 over the data bus 205. The MPEG decoder 204 receives the data, decrypts it using the encryption key and processes the data. Typical to this type of encryption or scrambling schemes is that does not preserve the integrity of error correction codewords and require that error correction be performed in the drive prior to encryption or scrambling therefore precluding the host processor from performing the error correction task.

There are many error correcting schemes, any of which may be implemented with the invention herein. A typical error correction scheme employs a Reed Solomon (RS) product code, where an N by M block of data has redundancy bytes added to it to form an (N+p) by (M+q) block of error correction codewords (ECC). Each of the N columns of the data block has q RS redundancy bytes added to the column to form an M+q RS codeword. Then each of the M+q rows of the new block have p RS codewords added to them to form RS codewords of length N+p. For purposes of this discussion herein, the NXM block of data is referred to as a data block, and this (N+p) by (M+q) block is referred to as an ECC block.

There may be errors, e.g. due to defects or noise, when data are read from a storage medium, such as a tape or disc. However, the fact that the data are contained in RS codewords allows these errors to be corrected.

Figure 4:
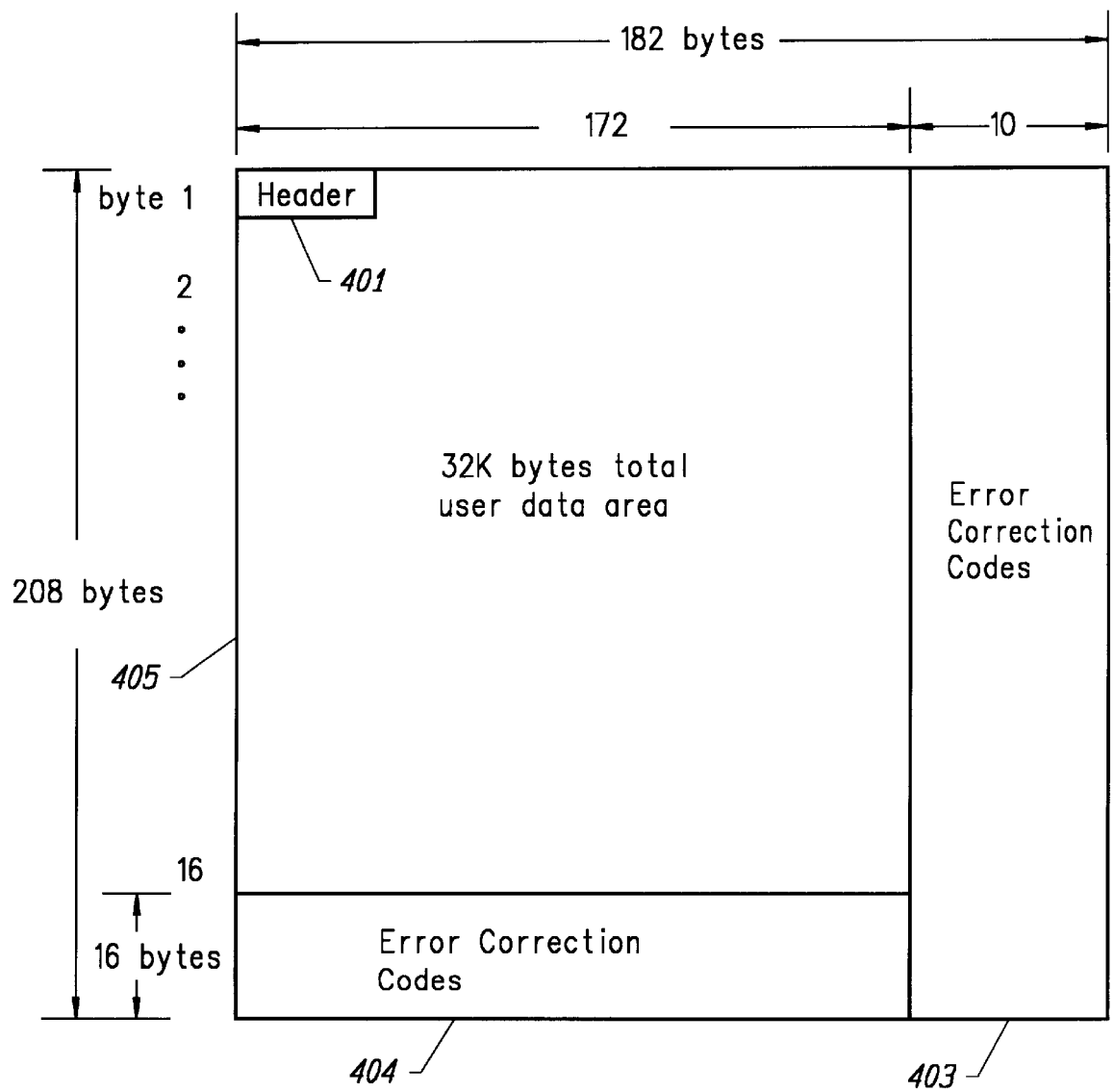
FIG. 4 is a block diagram showing the data layout of a Digital Video Disk data block according to the prior art.

Referring to FIG. 4, which shows a simplified version of the DVD format, for purposes of example only, user data are divided into 32K bytes 405. There are error correction codes associated with each row 403 and each column 404 in a two dimensional array. The whole data block is 208 bytes by 182 bytes in size. The length of the data block is 182 bytes, of which 172 bytes are user data 405 and the remaining ten bytes are error correction codes (ECC) 403 that are added for error recovery. Similarly, the number of rows is 208 with sixteen lines consisting of another set of ECC codes 404. A critical portion of the data is in the header information 401 which contains information relating to copy protection, in particular, an encryption key. Under normal circumstances the user receives this data and never needs to know what is in the header area 401 or in the ECC codes 403, 404. That information is extracted and checked while the data is in the drive. There are also data blocks in a lead in area (not shown) that contain highly confidential data.

A problem arises when the error correction function is removed from the drive and performed in the host computer. The host computer needs to know everything about the data, including the restricted header information 401 (as well as confidential data blocks in the lead in area.) The data has to be transferred from the drive to the host computer across the open data bus. If the data were scrambled, the error correction capability of the ECC would be destroyed. The invention solves the problem of transferring information across the open computer bus by encrypting the data so that it is not intelligible to persons using any devices to listen on the bus, but is still capable of being error corrected.

Figure 5:
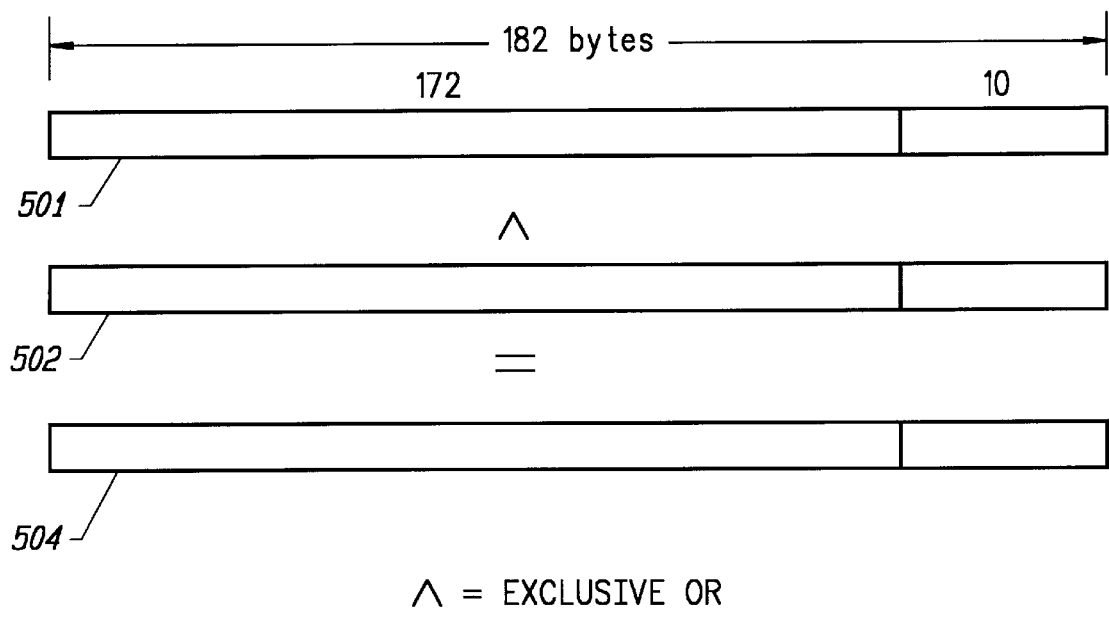
FIG. 5 is a block diagram showing the data codeword operation performed by a preferred embodiment according to the invention.

With respect to FIG. 5, an ECC codeword 501 is created by taking 172 bytes of user data plus the ten bytes of ECC calculated for those data bytes. This forms a consistent codeword such that if any errors occur anywhere in this codeword, up to a certain number, these errors can be detected and corrected. A second codeword 502 is created in the same manner but it is random data that has a set of ten bytes of ECC associated with it. When the two codewords are exclusive OR-ed, another codeword 504 results that is also valid. The resulting ten bytes of ECC provide the error correction codes appropriate for this new set of data. It should be appreciated that this approach can be extended to produce codes for any other error correction unit.

In a preferred embodiment of the invention, this approach covers an entire data block. A new block of data is created in the storage drive. The data may be generated, for example, using a well-defined pseudo random number generator also located on the storage drive. The length of the seed for the random number generator is long enough to ensure the required cryptographic strength. Once the 32K byte data area is created, the associated ECC bytes are then calculated to complete the new ECC block.

The data blocks containing the user data and the new data generated by the random number generator are exclusive OR-ed, to produce a third, resultant data block that is randomized, i.e. encrypted or scrambled. The data from the third block is protected because without knowledge of the random data block it is not possible to extract the original data.

Figure 6:
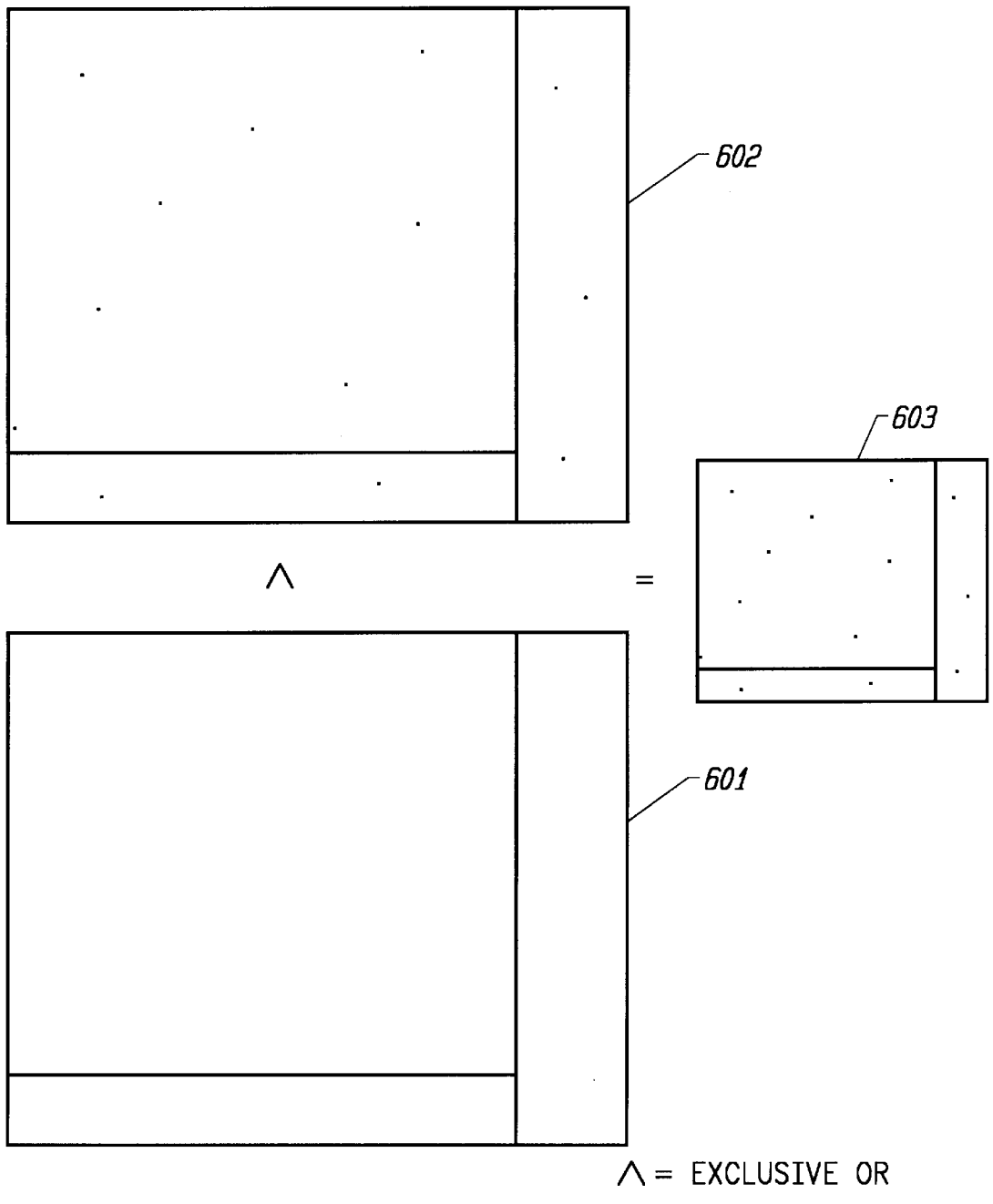
FIG. 6 is a block diagram showing the random number data block without errors and the user data block with errors according to the invention.

As a result of the foregoing operations, the error correction capabilities of the ECC's are preserved. Referring to FIG. 6, problems due to noise and/or defects in the media introduce errors that are scattered throughout the original user data block 602. There are no errors in the new data block containing the random numbers 601 because it has not been stored on media, transmitted, or was in any way vulnerable. Even if there were errors in such data block, they could also be corrected and the scheme herein described would operate satisfactorily. Therefore, when the two blocks are exclusive OR-ed, the fidelity of the ECC is maintained. Thus, the resultant data block 603 contains the errors in the same locations as the user data block and the code words are all consistent so that error correction can successfully correct the errors.

Figure 7:
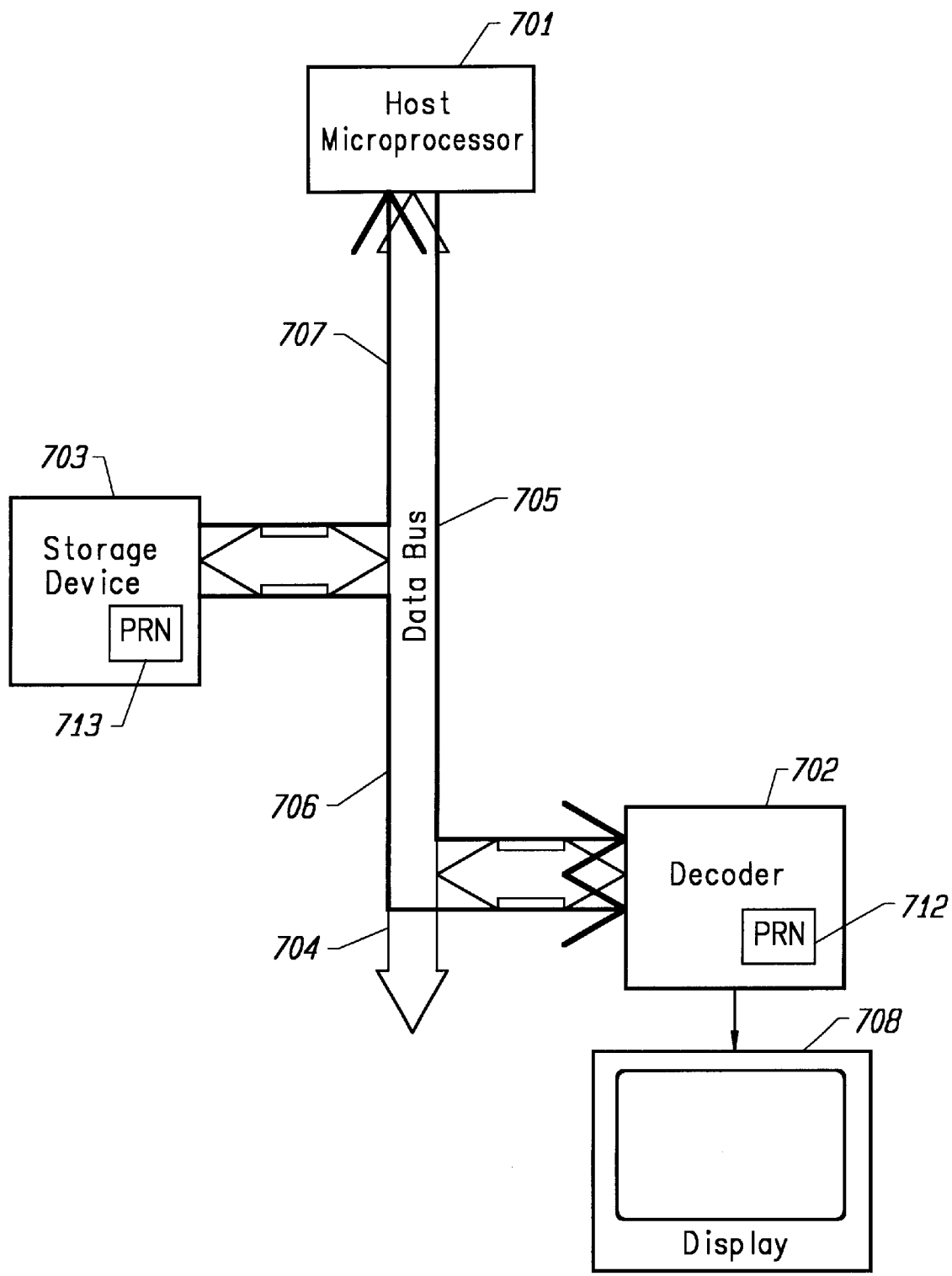
FIG. 7 is a block schematic diagram showing the data paths across a computer system data bus architecture performed by a preferred embodiment according to the invention.

Referring to FIG. 7, the resultant data block is now protected and sent 707 from the storage device 703 to the host processor 701 for error correction across the data bus 704. The host 701 does not have access to the actual information in the data block as it would appear in its unencrypted form, but can effectively perform error correction on the data block. Once the error correction task is complete, the corrected data are sent 705 to a trusted entity, e.g. an MPEG decoder 702.

The trusted entity, e.g. an MPEG decoder 702, must create the same random number data area that the storage device 703 created to encrypt the user data block. For example, both the storage device 703 and the trusted entity 702 decoder, could use the same random number generator 712, 713 with the same seed 706. Because both devices contain the same random number generator using the same seed, the data blocks that they create are identical. The decoder 702 does not need to decrypt any of the ECC sections. The encrypted user data are exclusive OR-ed again with the random number data and returned to their original state. The data are then processed by the decoder 702 and are available, e.g. In the case of video date they may be decoded and sent directly to the display 708 or display memory. The unencrypted data are not transmitted on the data bus 704.

Some advantages to this approach include:

The only additional information that needs to be sent to the trusted entity in a secure manner is the seed for the random number generator.

The random number seed need only be generated, encrypted, and transferred to the trusted entity only once at the beginning of a session. This operation may be performed in software because the time required should not be significant.

The processing power required to generate the pseudo random number sequence and the error correction codes is not significant compared to the processing power required to correct errors. The invention, therefore, imposes only a small burden on the drive, while removing the larger burden of error correction. The trusted entity must also be capable of generating the pseudo random sequence, but need not generate the error correction codes.

In another, equally preferred embodiment of the invention, the following steps are executed:

1) The drive generates a random number. The length of the random number seed is long enough to ensure the required cryptographic strength.

2) The drive generates a data sequence using a predefined pseudo random number generator which is seeded or initialized by the random number seed.

3) The drive generates redundancy that uses the same error correction code generation scheme as was used for the original data. In this way the drive generates a sequence of codewords, all of which are determined by the random number seed and which are consistent with the original ECC blocks.

4) The drive performs a bitwise exclusive OR between the original uncorrected codewords read from disc or tape and the drive generated codewords.

5) The resulting data stream also constitutes valid codewords which contain any errors contained in the codewords read from tape or disc. No additional errors are introduced by this technique, because the codewords generated by the drive do not contain any errors. The resulting data stream is effectively encrypted and can be sent to the host processor or other processing entity for error correction without risk of unauthorized copying of the original data.

6) Decryption is performed by a trusted entity, such as an MPEG decoder. To accomplish this, the drive transfers the seed number NR to the trusted entity in a secure manner, using a key that is negotiated using standard techniques.

7) The trusted entity then generates the same pseudo random data sequence that the drive had generated and uses this sequence to decrypt the error corrected, but still encrypted or scrambled data by once again bitwise exclusive OR-ing the random data sequence with the encrypted data.

Although the invention is described herein with reference to the preferred embodiment, one skilled in the art will readily appreciate that other applications may be substituted for those set forth herein without departing from the spirit and scope of the present invention. For example, a random data sequence may either be reused for processing subsequent data, or a new random data sequence may be generated for each quantity of data to be processed. Accordingly, the invention should only be limited by the claims included below.

I claim:

1. A process for applying cryptography to data while preserving error correction capabilities, comprising the steps of:

applying an error correction code generation scheme to data to which said cryptography is to be applied;

providing a random sequence generator;

generating a random data sequence;

creating a redundancy sequence for error correction by applying the same error correction code generation scheme to the random data sequence as that which had been applied to said data to which cryptography is to be applied; and combining said random data sequence with said redundancy sequence, wherein said redundancy sequence is equal to or greater than the size of data to be encrypted.

2. The process of claim 1, further comprising the step of:

generating a random number seed used to initialize a random number generator to produce said random data sequence;

wherein the length of said random number seed is long enough to ensure the required cryptographic strength.

3. The process of claim 2, further comprising the step of:

transferring said random number seed to a trusted entity in a secure manner.

4. The process of claim 1, further comprising the step of:

creating an encrypted data sequence by exclusive OR-ing said data to be encrypted and said random data sequence.

5. The process of claim 4, further comprising the step of:

performing error correction of said encrypted sequence on a host processor.

6. The process of claim 4, further comprising the step of:

performing error correction of said encrypted sequence on a trusted entity.

7. The process of claim 4, further comprising the step of:

generating a second data sequence using said predefined pseudo random number generator located on said trusted entity;

wherein said second data sequence is substantially equal in length to said data sequence.

8. The process of claim 7, further comprising the step of:

creating a decrypted data sequence by exclusive OR-ing said encrypted sequence and said second data sequence.

9. The process of claim 1, wherein said random data sequence is reused on subsequent data.

10. The process of claim 1, wherein said random data sequence is regenerated for subsequent data.

11. An apparatus for applying cryptography to data while preserving error correction capabilities, comprising:

means for applying an error correction code generation scheme to data to which said cryptography is to be applied, a pseudo random number generator for generating a random data sequence;

said pseudo random number generator creating a redundancy sequence for error correction by applying the same error correction code generation scheme to the random data sequence as that which had been applied to said data to which cryptography is to be applied; and means for combining said random data sequence with said redundancy sequence, wherein said redundancy sequence is equal to or greater than the size of data to be encrypted.

12. The apparatus of claim 11, said pseudo random number generator further comprising:

a module for generating a random number seed for initializing said random number generator to produce said random data sequence;

wherein the length of said random number seed is long enough to ensure the required cryptographic strength.

13. The apparatus of claim 12, said pseudo random number generator further comprising:

a module for transferring said random number seed to a trusted entity.

14. The apparatus of claim 11, said pseudo random number generator further comprising:

a module for creating an encrypted data sequence by exclusive OR-ing said data to be encrypted and said random data sequence.

15. The apparatus of claim 14, further comprising:

an error correction module located on a host processor;

wherein said error correction module performs error correction of said encrypted sequence on a host processor or other entity.

16. The apparatus of claim 14, further comprising:

an error correction module located on a trusted entity; and wherein said error correction module performs error correction of said encrypted sequence on a host processor.

17. The apparatus of claim 14, further comprising:

a module located on said trusted entity for generating a second data sequence using said predefined pseudo random number generator;

wherein said second data sequence is equal in length to said data sequence.

18. The apparatus of claim 17, said module for generating a second data sequence further comprising:

a module for creating a decrypted data sequence, by exclusive OR-ing said encrypted sequence and said second data sequence.

* * * * *